United States Patent [19]
Nakayama et al.

[11] Patent Number: 5,208,535
[45] Date of Patent: May 4, 1993

[54] MR POSITION DETECTING DEVICE

[75] Inventors: Akihito Nakayama; Satoshi Sakamoto, both of Tokyo, Japan

[73] Assignee: Research Development Corporation of Japan, Tokyo, Japan

[21] Appl. No.: 805,635

[22] Filed: Dec. 12, 1991

[30] Foreign Application Priority Data

Dec. 28, 1990 [JP] Japan .................................. 2-416675
Jan. 17, 1991 [JP] Japan .................................. 3-015723

[51] Int. Cl.[5] .......................................... G01R 33/20
[52] U.S. Cl. .................................... 324/318; 324/322
[58] Field of Search ............... 324/300, 301, 302, 307, 324/308, 309, 318, 322; 128/653.5; 335/299

[56] References Cited

U.S. PATENT DOCUMENTS 3,693,072 9/1972 Irons et al. .......................... 324/301

FOREIGN PATENT DOCUMENTS 0235750 9/1987 European Pat. Off. .

OTHER PUBLICATIONS

8108 I.E.E.E. Transactions on Magnetics, MAG-23 (1987) Sep., No. 5, New York, New York.

Primary Examiner—Michael J. Tokar
Attorney, Agent, or Firm—Wenderoth, Lind & Ponack

[57] ABSTRACT

An MR position detecting device according to the present invention comprises a magnet having magnetic poles alternately magnetized at predetermined intervals, a magnetoresistive element having magneto-detectors for a plurality of phases successively disposed a predetermined distance apart, with a pair of the magneto-detectors provided for each phase. The pair of magneto-detectors for each phase change their resistance values in response to the magnetic field of the magnet, are disposed half the formed magnetic pole width, in substance, apart, and are applied with voltage at both ends of a series connection thereof so as to output a signal from the middle point of the connection. A signal processing circuit defects a change in relative position between the magnetoresistive element and magnet on the basis of a signal obtained from the outputs of the pairs of magneto-detectors for the respective phases of the magnetoresistive element therefore, the device may detect position with high resolution and accuracy.

7 Claims, 10 Drawing Sheets

F I G. 6A
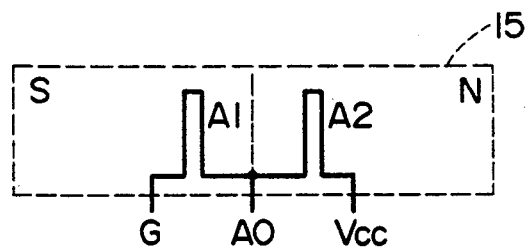
F I G. 6B
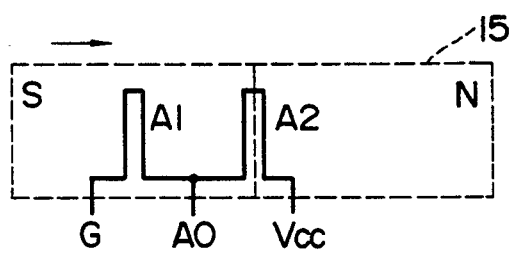
F I G. 6C
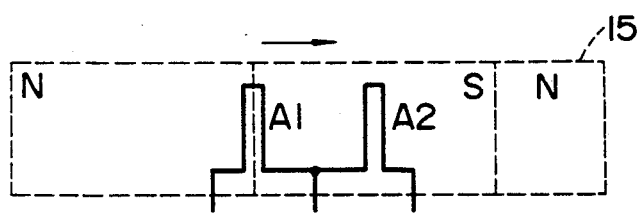
F I G. 7
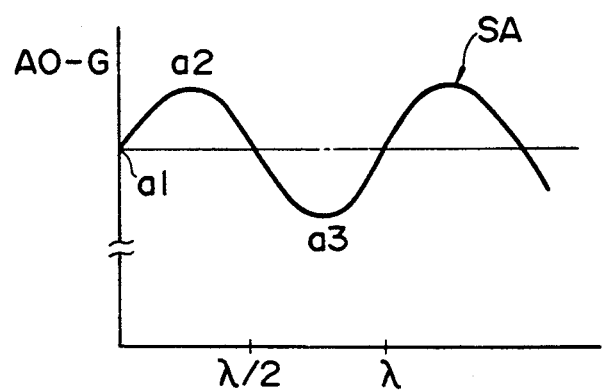

MR POSITION DETECTING DEVICE

BACKGROUND OF THE INVENTION

The present invention relates to a position detecting device for detecting the position of an object and, more particularly, to an MR position detecting device for detecting the position of an object required to be detected with high resolution (accuracy), such as the position of a zoom lens or a focus lens disposed in the lens-barrel of the camera within a video camera by the use of a magnetoresistive (MR) element. The invention, further relates to a position detecting device for providing a position detecting signal with high resolution by interpolation of position detection signals output from MR elements for a plurality of phases.

An object whose position is required to be detected with high resolution, there is the position detection of a zoom lens or a focus lens within a video camera. The lens-barrel of a video camera is constructed, for example, of four groups of lens systems to achieve the zoom function and autofocus function. The lens systems of the first group and third group are fixedly disposed, while the lens system of the second group for zooming and the lens system of the fourth group for focusing are movably disposed within the lens-barrel. The zoom lens is driven, for example, by a stepping motor and the focus lens is driven, for example, by a voice motor.

In a video camera, in general, position control is executed such that the focus lens is shifted corresponding to the movement of the zoom lens and the position of image formation is kept fixed at all times. Especially in the "manual zoom tracking" mode in which the zoom lens is manually moved, the focus lens must be shifted such that its position traces a certain preset locus and the focus lens must be positioned with accuracy within about 20 μm.

Conventionally, in detecting the position of the zoom lens and focus lens, a method has been used in which the number of steps of a stepping motor is calculated and the position is indirectly detected therefrom. Another method uses a potentiometer and the traveling lens position is detected from the change in its resistance.

When potentiometers are used, since inequalities of resistance value are produced in the potentiometers, complex adjustment work for compensating for the inequalities must be made for individual video cameras. A problem arises since a large quantity of labor is required when such adjustment work is to be done on a large number of video cameras. Further, such a problem is encountered since the resistance value of the potentiometer varies with changes in temperature and, hence, its accuracy is lowered even after the above described adjustments are made. Furthermore, there is a problem that power is consumed for driving the potentiometer and, hence, a loss is produced in the thrust for the lens system and reliability is lowered.

On the other hand, the method in which the number of steps of the stepping motor is calculated cannot be applied to a lens for which a stepping motor is not used, i.e., to the focus lens in the above case. Further, in such a method in which the number of steps of the stepping motor is counted and the position is thereby indirectly detected, sometimes a disadvantage exists in that the phase of the input current and the angle of rotation does not have a one-to-one correspondence due to such factors as the detent. Therefore, a position different from the actual position becomes detected. Especially in this position detection method, a problem exists in that once an error was made during a course of position detection, the detection error remains unless the detection is reset to the reference position.

So far discussion has been made about a video camera taken as an example, but such problems as mentioned above are also encountered in position detections with other instruments where high resolution is required.

SUMMARY OF THE INVENTION

Accordingly, an object of the present invention is to provide a position detecting device which causes no loss in the power applied to the object of the position detection, is not affected by inequalities of position detecting elements and by changes in temperature, requires no adjustment, and is capable of direct position detection with high resolution (accuracy) and reliability.

The present invention relates to a position detecting device for detecting the position of an object and, more particularly, to an MR position detecting device for detecting the position of an object required to be detected with high resolution such as the position of a zoom lens or a focus lens disposed in the lens-barrel of the camera within a video camera by the use of a magnetoresistive element.

An MR position detecting device according to the present invention is characterized by a magnet having magnetic poles alternately magnetized at predetermined intervals, a magnetoresistive element having magneto-detectors for a plurality of phases successively disposed a predetermined distance apart, with a pair of the magneto-detectors provided for each phase. The pair of magneto-detectors for each phase change their resistance values in response to the magnetic field of the magnet and are disposed half the formed magnetic pole width, in substance, apart. The magneto-detectors are applied with a voltage at both ends of a series connection thereof so as to output a signal from the middle point of the connection. A signal processing circuit detects a change in relative position between the magnetoresistive element and magnet on the basis of a signal obtained from the outputs of the pairs of magneto-detectors for the respective phases of the magnetoresistive element.

BRIEF DESCRIPTION OF THE DRAWINGS

FIGS. 6A, 6B, and 6C are diagrams showing the operation of a pair of magneto-detectors of the MR sensor of FIG. 3.

FIG. 7 is a signal waveform chart obtained from the pair of magneto-detectors of FIG. 6.

DETAILED DESCRIPTION OF THE PREFERRED EMBODIMENTS

Figure 1:
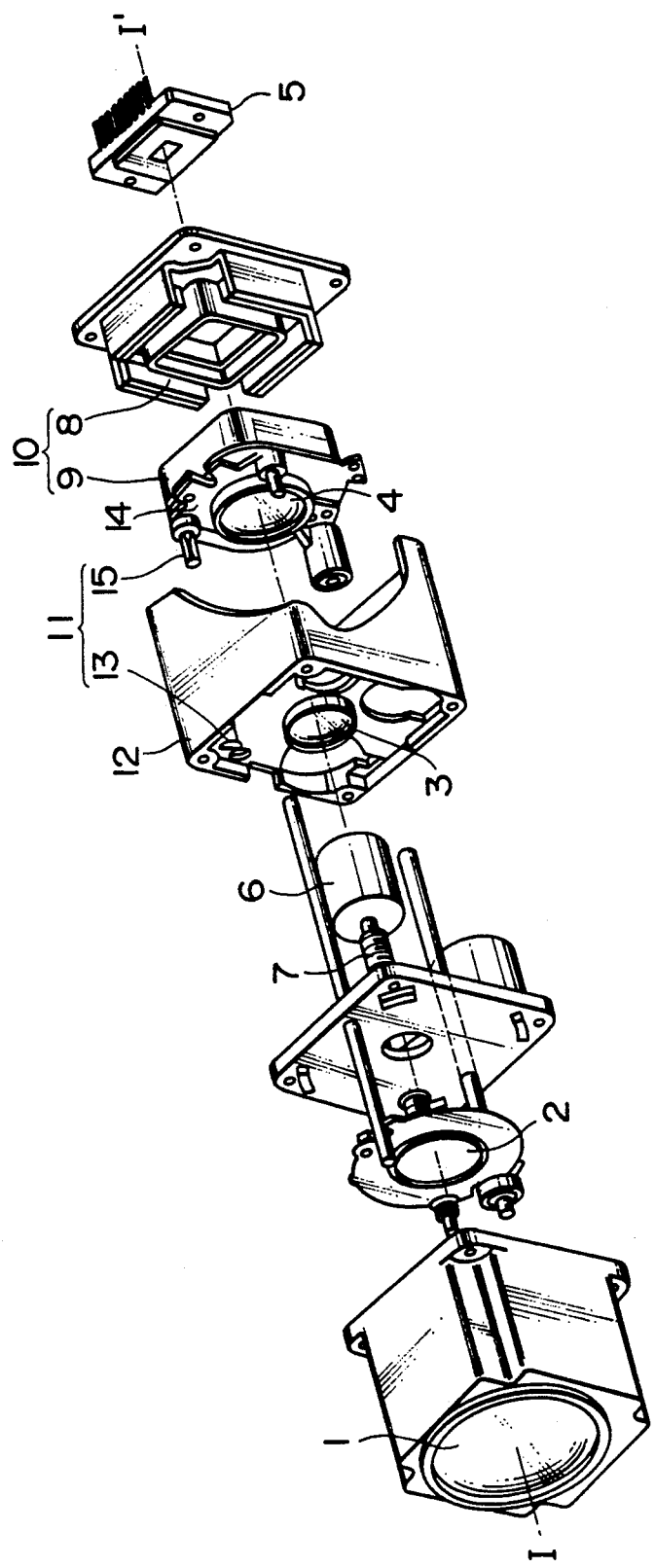
FIG. 1 is an exploded perspective view of a lens-barrel of a video camera as an embodiment of an MR position detecting device of the present invention.

The present invention provides a position detection signal highly reliable and with high resolution by means of a non-contact type MR position detecting device made up of a magnet and a magnetoresistive (MR) element.

An MR position detecting device according to the present invention comprises a magnet having magnetic poles alternately magnetized at predetermined intervals, a magnetoresistive element having magneto-detectors for a plurality of phases successively disposed a predetermined distance apart, with a pair of the magneto-detectors provided for each phase. The pair of magneto-detectors for each phase change their resistance values in response to the magnetic field of the magnet, are disposed half the formed magnetic pole width, in substance, apart, and are applied with a voltage at both ends of a series connection thereof so as to output a signal from the middle point of the connection. A signal processing circuit detects a change in relative position between the magnetoresistive element and magnet on the basis of a signal obtained from the outputs of the pairs of magneto-detectors for the respective phases of the magnetoresistive element.

Preferably, the pairs of magneto-detectors are successively disposed a distance of 'formed magnetic pole width/number of phases' apart and the signal processing circuit outputs a signal of 2 m pulses, with m being an even number 2 or above and representing the number of phases, or 4 n pulses, with n being an odd number, 3 or above and representing the number of phases, for each formed magnetic pole width.

More preferably, each one of the magneto-detectors of each pair is formed of two magneto-detectors spaced the formed magnetic pole width apart and is adapted to operate complementarily of the other. These sets of magneto-detectors are disposed a distance of half the formed magnetic pole width, in substance, apart.

Further, one of the magnet and the magnetoresistive element is operatively mounted in a camera for movement together with a movable lens system disposed within the camera, while the other of the magnet and the magnetoresistive element is mounted on a portion fixed relative to the movable lens system so that the position of the lens system may be detected.

Further, the position detecting device of the present invention, in performing position detection with a polyphase MR element, samples signal components a good linearity out of components of sine wave signals for the plurality of phases output from the MR element and performs a linear interpolating calculation on the sampled values to thereby output the position detection signal.

More specifically, the position detecting device according to the present invention comprises a magnetoresistive element adapted for detecting the position with predetermined resolution to output position detection signals of polyphase sine wave forms corresponding to the change in position of magnetic field generation means. A position calculation means picks up from the polyphase position detection signals between crossing points of the signals for successive phases and calculates a position detection signal by interpolating the extracted signals.

The magneto-detectors are arranged to cross the magnetic field from the magnet and reduce their resistance values corresponding to the magnetic intensity. By applying the voltage to the magneto-detectors, the changes in resistance value can be detected as changes in voltage.

The magneto-detector for each phase is basically formed as a pair of magneto-detectors spaced $\lambda/2$ apart, $\lambda$ being the width of each of the pairs of magnetic poles in the magnet, and a voltage is output from the connecting point of the pair of magneto-detectors. From the middle point of the pair of magneto-detectors, arranged as described above, a change-in-position signal of two swings of double frequency is obtained for movement of one formed magnetic pole width.

The magneto-detectors for the respective phases are arranged at intervals of $\lambda$/number of phases so that change-in-position signals as described above with a predetermined angular relationship. For example, a phase difference of 120° between successive phases would arise in the case of a three phase arrangement.

The signal processing circuit detects the change in position from the changes in the plurality of phase signals and the manner of combination of the phase signals and outputs a change-in-position detection signal of 2 m pulses or 4 n pulses corresponding to a shift of the formed magnetic pole width $\lambda$.

The position detection means analyses the phases of the plurality of position detection signals output from the MR element and performs interpolation on linear signal components between crossing points of signals for successive phases to thereby output an accurate position signal with high resolution.

An example of a preferred embodiment of an MR position detecting device according to the present invention as applied to lens position detection within a video camera will be described below with reference to the accompanying drawings.

FIG. 1 is an exploded perspective view of the lens-barrel of a video camera to which the MR position detecting device of an embodiment of the present invention is applied. Along the optical axis I-I' in the direction from the front to the rear of the camera lens-barrel, are arranged a first group lens 1 for focusing, a second group lens 2 for zooming, a third group lens 3 for correction, and a four group lens 4 for focusing. In the focal position of the fourth group lens, a CCD image pickup element 5 is disposed.

While the first group lens 1 and third group lens 3 are both fixed at predetermined positions in the lens-barrel, the second group lens 2 and fourth group lens 4 are shifted back and forth along the optical axis I-I'.

The second group lens 2 is coupled with the output shaft of a stepping motor 6 by means of a lead screw 7 and adapted to be shifted forward and backward by positive and negative rotation of the stepping motor 6. The fourth group lens 4 is operatively associated with a voice coil motor 10 made up of a permanent magnet 8 and an electromagnet coil 9 and is adapted to shift forward and backward by the control of the current flow through the coil 9 and its electric polarity.

The MR position detecting device 11 of the present embodiment in this example detects the position of the fourth group lens 4 for focusing.

Figure 2:
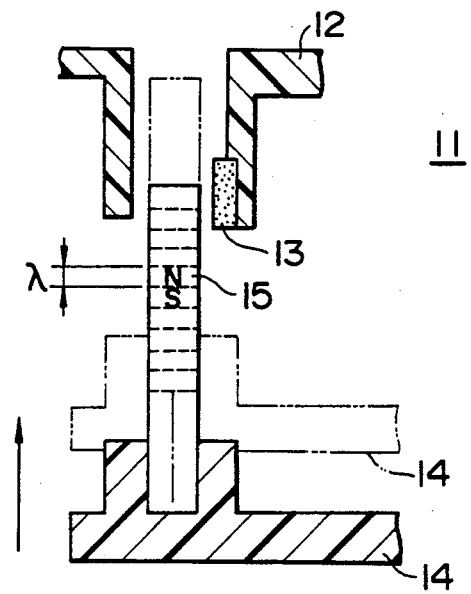
FIG. 2 is a diagram showing the state in which an MR sensor and a magnet constituting an MR position detecting device according to an embodiment of the present invention is mounted in a lens-barrel.

As shown in FIG. 2, the MR position detecting device 11 is formed of an MR sensor 13 functioning by magneto-resistive effect and disposed on the wall of an insertion hole for a magnet 15 provided in the frame 12, which mounts the fixed third group lens 3 therein. The magnet 15 is in a bar form and is embedded in a lens support plate 14, which supports the fourth group lens 4 and a later described signal processing circuit. The support plate 14 with the magnet 15 embedded therein is shifted, together with the focus lens, as indicated by the dotted line in the drawing. Consequently, the magnet 15 moves parallel to the MR sensor 13 in close vicinity to the MR sensor 13.

The magnet 15 has a plurality of pairs of N and S magnetic poles alternatively formed along its length with each formed magnetic pole width $\lambda$ being, for example, $\lambda = 150$ $\mu$m.

Figure 3:
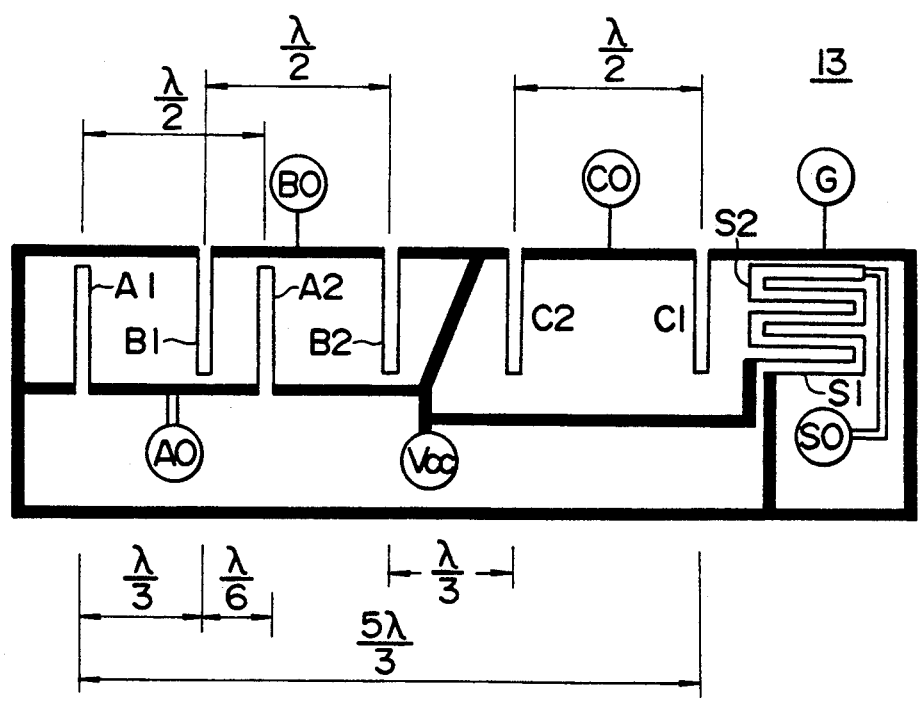
FIG. 3 is a diagram of a formation pattern of an MR sensor of a first and third embodiments of the present invention.

FIG. 3 shows details of the MR sensor 13. The MR sensor 13 is formed of three pairs of magneto-detectors A1-A2, B1-B2, and C1-C2 to output three-phase change-in-position signals in response to a shift of the formed magnetic pole width $\lambda$. Each magneto-detector, for example A1, is formed of two wires obtained by folding back a fine wire of 500 Å-1000 Å by sputtering or etching on a ferromagnetic film. The film may comprise, for example, an iron-nickel film or a cobalt-nickel film. The width of the folded wires is, for example, 10 $\mu$m.

In order that the magneto-detectors A1, A2, B1, B2, C1, and C2 produce changes in their resistance value by the magnetic field from the magnet 15, they are formed to be elongated in the direction crossing, or orthogonal to, the direction of the magnetic field of the magnet 15. Meanwhile, wires connecting the magneto-detectors with each other, indicated by thick lines in the drawing, formed on the same ferromagnetic film as that for the magneto-detectors are arranged in the direction parallel to the magnetic field of the magnet 15 and are shaped wider, for example, a width of 100 $\mu$m, in order that they not produce a change in resistance when subjected to the magnetic field of the magnet 15.

The pairing magneto-detectors A1-A2, B1-B2, and C1-C2 are each spaced $\lambda/2$, half the formed magnetic pole width $\lambda$ within the magnet 15, apart. The magneto-detector A1 for the first phase and the magneto-detector B1 for the second phase are spaced $\lambda/3$ apart, and the magneto-detector A1 for the first phase and the magneto-detector C1 for the third phase are spaced one full width $\lambda$ plus $2\lambda/3$, or $5\lambda/3$, apart. The arrangement of the magneto-detectors C1 and C2 for the third phase is opposite to that of the magneto-detectors for the first phase and second phase and. Thus, the magneto-detectors for the first phase and the magneto-detectors for the third phase are spaced $2\lambda/3$, in substance, apart, while the magneto-detector B2 for the second phase and the magneto-detector C2 for the third phase are spaced $\lambda/3$ apart.

By arranging magneto-detectors for each phase as described above, three-phase position detection signals, with a phase difference of 120° between successive phases, can be generated.

The pairing magneto-detectors for each phase, for example the magneto-detectors A1 and A2 for the first phase, are connected by the above described thick connecting wire and an output terminal AO is formed in the middle of the connecting wire.

To detect the changes in resistance of the magneto-detectors as changes in voltage, a terminal for applying a power supply voltage Vcc and a grounding terminal G are provided.

In order to obtain a later described reference voltage Vcc/2, which is half the power supply voltage Vcc, there are formed magneto-detectors S1 and S2 in such a way that they are elongated in the direction parallel to the magnetic field to avert the effect of the magnetic field of the magnet 15 as much as possible and juxtaposed to cancel effects of the magnetic field. There is also provided an output terminal SO at the middle point of the connection between the magneto-detectors S1 and S2.

The connecting wire between the supply voltage terminal Vcc and the magneto-detector C2 is diagonally arranged also to avert the effect of the magnetic field of the magnet 15. Preferably, the thickness of the diagonal connecting wire is formed to be the same as the formed magnetic pole width $\lambda$ so that the wire can completely avert the effect of the magnetic field of the magnet 15.

Figure 4:
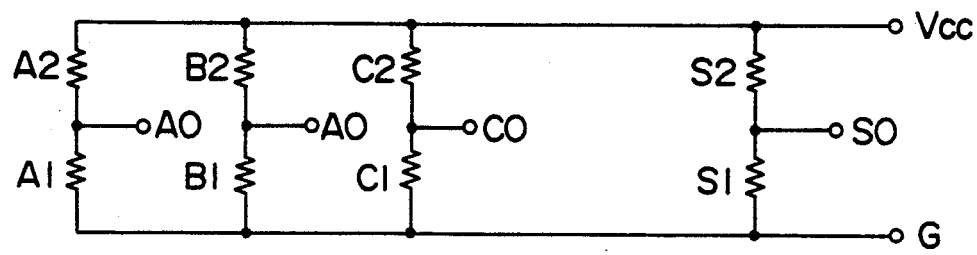
FIG. 4 is an equivalent circuit diagram for the MR sensor of FIG. 3.

FIG. 4 shows an equivalent circuit diagram of the MR sensor 13 shown in FIG. 3. The magneto-detectors for each phase, for example the magneto-detectors A1 and A2 for the first phase, are connected in series between the supply voltage Vcc terminal and ground G and the output terminal AO is connected to the middle point of the series connection. Thus, the voltage at the output terminal AO relative to ground G is the position detection signal for the first phase. The output terminal SO at the midpoint of the magneto-detectors S1 and S2 is always at the reference voltage Vcc/2, half the supply voltage.

The operation principle of a magneto-detector, A1, for example, will now be described.

Figure 5A:
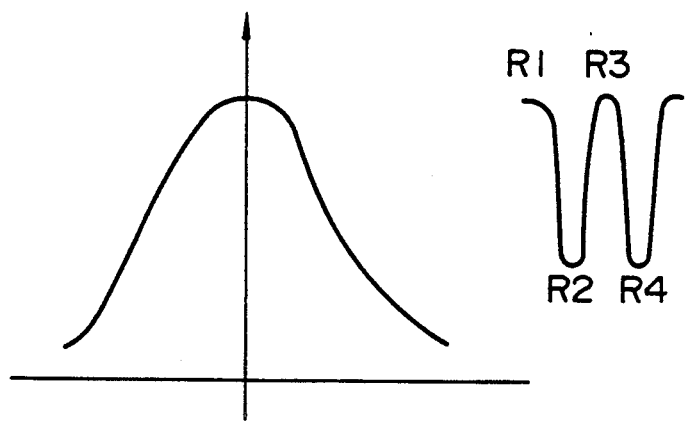
FIGS. 5A and 5B are characteristic curves showing the performance of one magneto-detector in the MR sensor of FIG. 3.
Figure 5B:
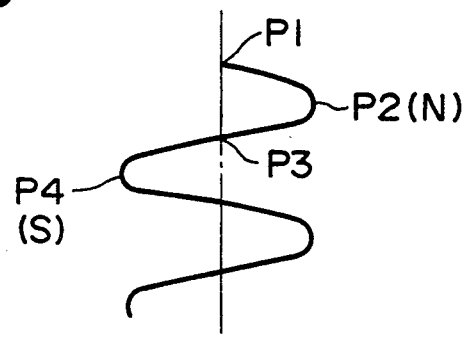

FIG. 5 is a characteristic curve showing the operating principle of the magneto-detector A1. When a magnetic field as shown in FIG. 5(c) is applied thereto, the resistance value of the magneto-detector varies according to the characteristic shown in FIG. 5(a). When no magnetic field is applied, the point P1 in FIG. 5(c), it exhibits no change in resistance, the point R1 in FIG. 5(b). When the magnetic field from the pole N is at its maximum, the point P2 in FIG. 5(c), the decrease in the resistance value reaches its maximum, the point R2 in FIG. 5(b). When no field is applied again, the point P3 in FIG. 5(c), it exhibits no change in resistance, the point R3 in FIG. 5(b). When the magnetic field from the pole S is at its maximum, the point P4 in FIG. 5(c), the decrease in the resistance value reaches its maximum, the point R4 in FIG. 5(b).

Now, the operation of a pair of magneto-detectors A1 and A2 will be described. When the relative positions between the magnet 15 and the magneto-detectors A1 and A2 are as shown in FIG. 6(a)–FIG. 6(c), the voltage from the output terminal AO exhibit magnitudes as indicated by the points a1, a2, and a3 in FIG. 7. More specifically, when the midpoint of the magneto-detector A1 and A2 is located on the borderline between the pole N and pole S of the magnet 15 as shown in FIG. 6(a), the magnetic field applied to both the magneto-detectors are equal and, hence the, resistance values for them become equal. Accordingly, the average voltage Vcc/2 is output from the output terminal AO. When the magnet 15 has moved to the position as shown in FIG. 6(b), the magneto-detector A2 is located on the borderline between the magnetic poles. Hence, it receives a strong magnetic field to produce a considerable decrease in its resistance value and, accordingly, the output voltage becomes higher than Vcc/2. When the relative position is as shown in in FIG. 6(c), a result opposite that in the case of FIG. 6(b) is obtained.

As the magnet 15 moves relative to the magneto-detectors A1 and A2, the output from terminal AO becomes a sine wave, or cosine wave, signal with its amplitude swinging up and down centering around the average voltage, or reference voltage. The average voltage may be the supply voltage Vcc/2, as shown in FIG. 7.

Figure 8:
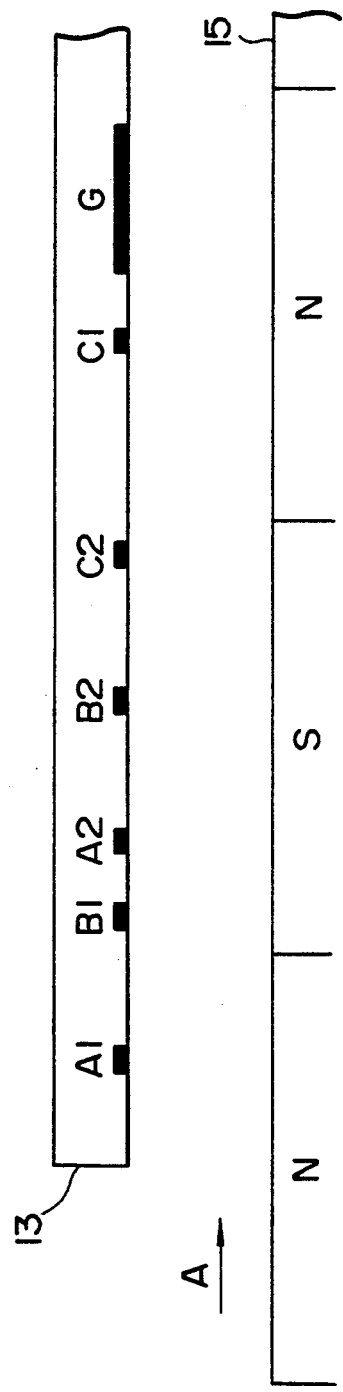
FIG. 8 is a diagram showing a relative position between each of the magneto-detectors in the MR sensor of FIG. 3 and magnet poles in the magnet.
Figure 9:
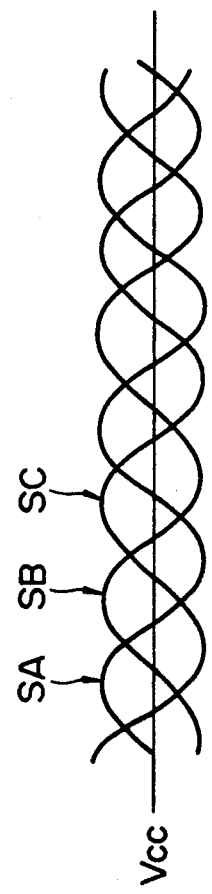
FIG. 9 is a signal waveform chart of three-phase phase signals obtained from the MR sensor of FIG. 8.

The poles N and S of the magnet 15 and the magneto-detectors of the MR sensor 13 are arranged to confront each other as the poles N and S of the magnet 15 move relative to the magneto-detectors, as shown in FIG. 8. The position detection signals SA, SB, and SC of the respective phases are produced as three-phase position detection signals having amplitudes swinging up and down centering around the level of reference voltage Vcc/2. The signals SA, SB, and SC have a phase difference of 120° between successive phases as shown in FIG. 9.

Figure 10:
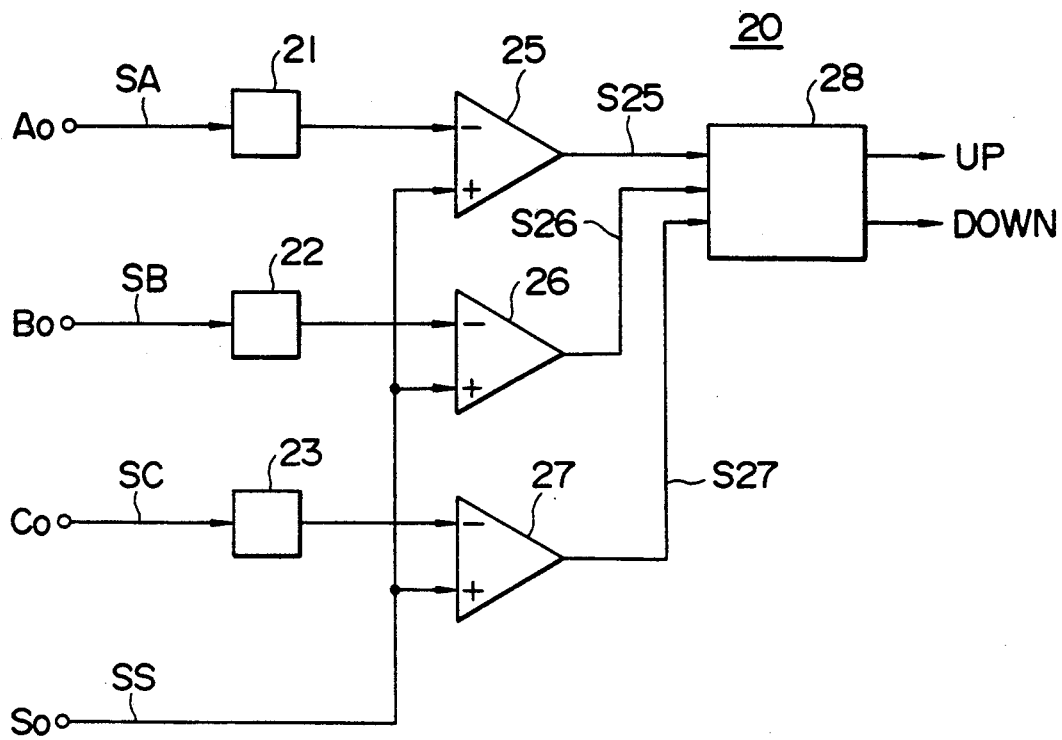
FIG. 10 is a block diagram of a position detection signal processing circuit constituting the MR position detecting device according to the first embodiment of the present invention.

FIG. 10 shows a circuit diagram of a position detection signal processing circuit 20 for detecting the direction of movement and change in the position of the magnet 15 on the basis of the above described three-phase position detection signals. The output terminals AO, BO, and CO of the magneto-detectors are connected to inverting input terminals (−) of comparators 25–27 through buffer amplifiers 21–23, respectively. The output terminal SO having the reference voltage Vcc/2 is connected with the noninverting input terminals (+) of the comparators 25–27.

When the voltage at an output terminal AO, BO, or CO is higher than the reference voltage Vcc/2 from the output terminal SO, the respective output of the comparator goes "high". When it is lower than the reference voltage, the output goes "low." FIG. 11 shows the outputs S25–S27 of the comparators 25–27 upon receipt of the three-phase position detection signals.

A phase discrimination circuit 28, using logical signals S25–S27 at a "high" level or a "low" level from the comparators 25–27, detects the change in position and the direction of movement of the magnet 15. The phase discrimination circuit outputs an up pulse UP when the magnet 15 is moving toward the front of the lens-barrel and outputs a down pulse DOWN when the magnet 15 is moving toward the rear of the lens-barrel. The decision of the direction of movement is achieved by discriminating between the generated timing of comparison signals of two phases, for example that of the comparison signal S25 of the first phase and that of the comparison signal S26 of the second phase. If the comparison signal S25 of the first phase is generated earlier than the comparison signal S26 of the second phase, then the magnet 15 is moving forward and the up pulse UP is generated.

Figure 11:
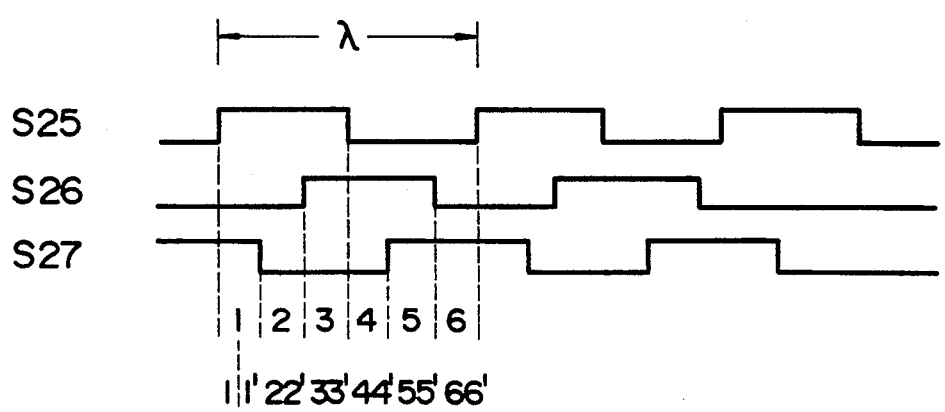
FIG. 11 is a diagram showing output signals of the position detection signal processing circuit of FIG. 10.

As is apparent from FIG. 11, the logical signals divide the formed magnetic pole width λ into six divisions. Accordingly, the phase discrimination circuit 28 identifies the direction of movement of the magnet 15 and outputs a pulse signal with as high a resolution, or accuracy, as one-sixth of the formed magnetic pole width λ.

If the formed magnetic pole width λ within the magnet 15 is reduced, the position detection accuracy of the MR sensor 13 can be increased. There is a limit however, to the reduction in the formed magnetic pole width λ. The limit, for example, is around 150 μm. Therefore, the position detection accuracy of 20 μm, or thereabout, required as the positioning accuracy for the focus lens of video cameras as described above cannot be obtained by the use of only the magnet and magnetoresistive element.

However, if pulse signals dividing the formed magnetic pole width into six divisions can be obtained by using the three-phase magneto-detectors as in the above described embodiment, the resolution of the position detection signal UP or DOWN output from the signal processing circuit 20 becomes 25 μm.

Further, by comparing in the phase discrimination circuit 28 the potential at the output terminal AO for the first phase with the potential at the output terminal BO for the second phase, the potential at the output terminal BO for the second phase with the potential at the output terminal CO for the third phase, and the potential at the output terminal CO for the third phase with the potential at the output terminal AO for the first phase, each of the above described one-sixth divisions can be further divided into two divisions. Thus, finally, the formed magnetic pole width can be divided into 12 divisions. Thereby, the position detection pulse UP or DOWN having the resolution of 12.5 μm and indicating the direction of movement can be obtained. By the use of such pulse signals, the above described "manual zoom tracking" control of the video camera can be performed accurately.

According to the present embodiment, as described above, even if there is a limit to the formation of the magnetic poles within the magnet 15, a position detection signal with necessary resolution can be obtained without being subjected to a restriction in the formed magnetic pole width. Further, since the MR sensor 13 and magnet 15 can generate a real position detection signal in a noncontact manner, the real position of the focus lens can be detected without being affected by such factors as the detent in the stepping motor. The MR sensor 13 and magnet 15 suffer from essentially no deterioration in accuracy by changes in temperature. Any inequalities in manufacturing are produced and complex adjustments are not necessary. Since the MR sensor 13 and magnet 15 operate in a noncontact manner, no change in characteristics is produced by wear. No large power supply is required for moving the magnet 15 and hence the thrust exerted on the focus lens is not lowered. Besides, the pulse signal output from the phase discrimination circuit 28, may be used in lens position controlling device constituted of a microcomputer or the like and has a high noise immunity.

Figure 12:
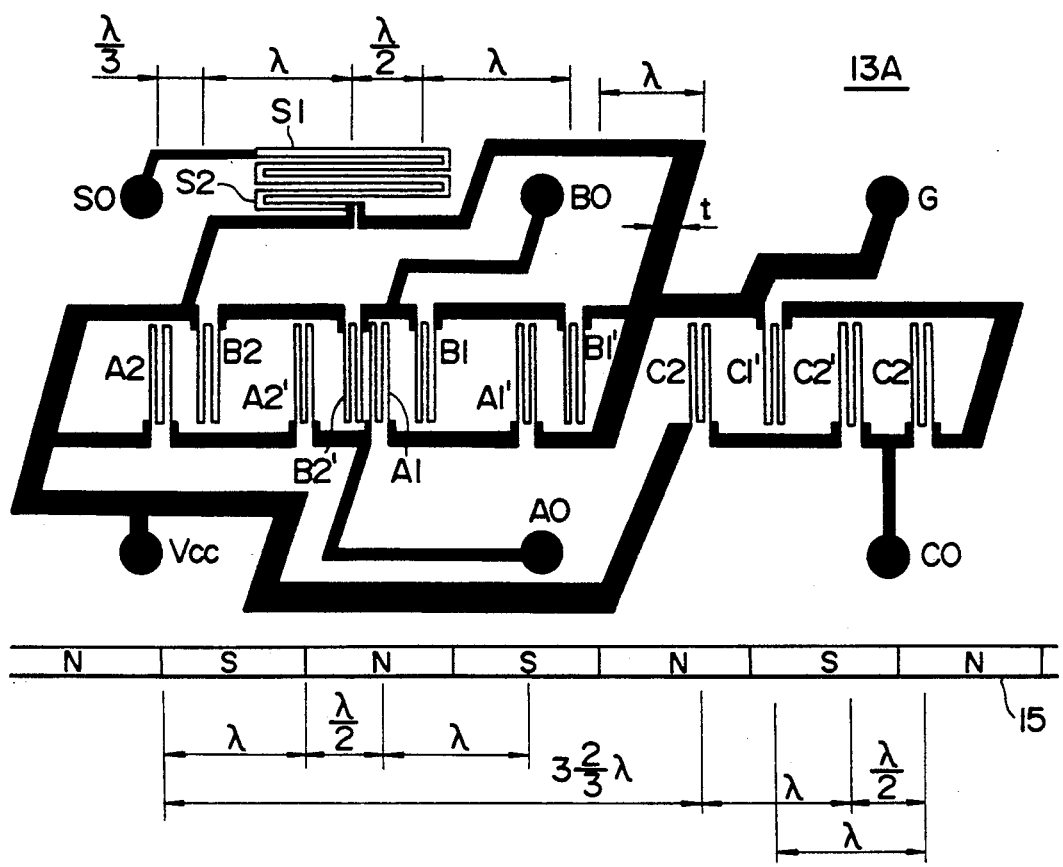
FIG. 12 is a formation pattern diagram of an MR sensor as a second embodiment of the present invention.

FIG. 12 shows a formation pattern of magneto-detectors of an MR sensor 13A according to a second embodiment of the present invention.

This second embodiment is also for obtaining three-phase outputs. The first magneto-detector, as with the first embodiment, is for the first phase and is formed of two magneto-detectors A1 and A1' spaced λ apart, the second magneto-detector is formed of two magneto-detectors A2 and A2' spaced λ apart, and, further, the magneto-detectors A2' and A1 are spaced λ/2 apart. Hence, also in this embodiment, the set of the first magneto-detectors A1 and A1' and the set of the second magneto-detector A2 and A2' are spaced λ/2, in substance, apart. Further, each magneto-detector, for example A1, is formed of two sets of folded thin wires.

Since the magneto-detectors A1 and A1', as well as A2 and A2', are spaced the formed magnetic pole width λ apart, a meritorious effect can be obtained in that errors of the change in resistance on the borderlines between adjoining poles N and S are canceled. Further, since the distance between the magneto-detectors are made wider, power consumption can be reduced. Furthermore, since each magneto-detector is formed of two sets of folded thin wires, the measurement error on the borderlines between adjoining magnetic poles can be made still smaller.

Figure 13:
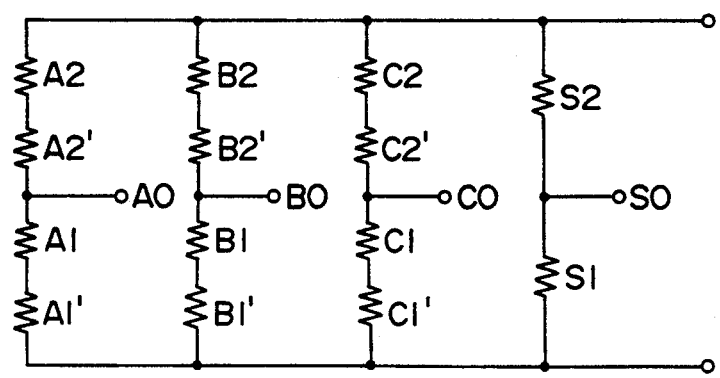
FIG. 13 is an equivalent circuit diagram for the MR sensor of FIG. 12.

An equivalent circuit to the MR sensor 13A of FIG. 12 is shown in FIG. 13. When attention is paid to the first phase, for example, the voltage corresponding to the change in resistance between the set of magneto-detectors A1 and A1' and the set of magneto-detectors A2 and A2' is generated from the output terminal AO.

The formation of magneto-detectors for other phases and effects obtained therefrom are the same as with the above described magneto-detectors for the first phase.

In FIG. 12, the portions of the connecting wires between magneto-detectors arranged in the direction crossing the magnetic field of the magnet 15 are also slanted with a predetermined angle so that the changes in resistance between the upper and lower portions are canceled and the changes in resistance produced by the effect of the change in magnetic field is thereby suppressed as much as possible. It is preferred to make the width t of the connecting wire at the slanted portions the same as the formed magnetic pole width λ.

The embodiments of the MR position detecting device of the present invention are not limited to the above described embodiments but various other modifications can be made.

It is possible to obtain signals dividing the formed magnetic pole width λ into divisions of an arbitrary plural number. For example, the magneto-detectors for each phase may be spaced λ/4 apart for obtaining four-phase phase signals and the magneto-detectors for each phase may be spaced λ/5 apart for obtaining five-phase phase signals. The resolution in the case of the four-phase signals becomes λ/(4 phase×2)=λ/8. In the case of the five-phase signals, the resolution becomes λ/(5 phase×4)=80/20. Since the direction of movement of the magnet can be identified if there are two phases, the number of phases may be arbitrarily set to 2 or above. In the case of a plural phase arrangement, the distance between magneto-detectors for adjoining phases are spaced λ/(number of phases) apart. Thereby, change-in-position detection pulses with the resolution of 2 m (m: number of phases) when the number of phases is an even number, or of 4 n (n: number of phases) when the number of phases is an odd number with respect to the formed magnetic pole width λ can be obtained. Each of the magneto-detector may be arranged in the form of one set of folded wires as shown in FIG. 3 or two sets of folded wires as shown in FIG. 12. Otherwise, it may be arranged in the form of four sets of folded wires.

Figure 14:
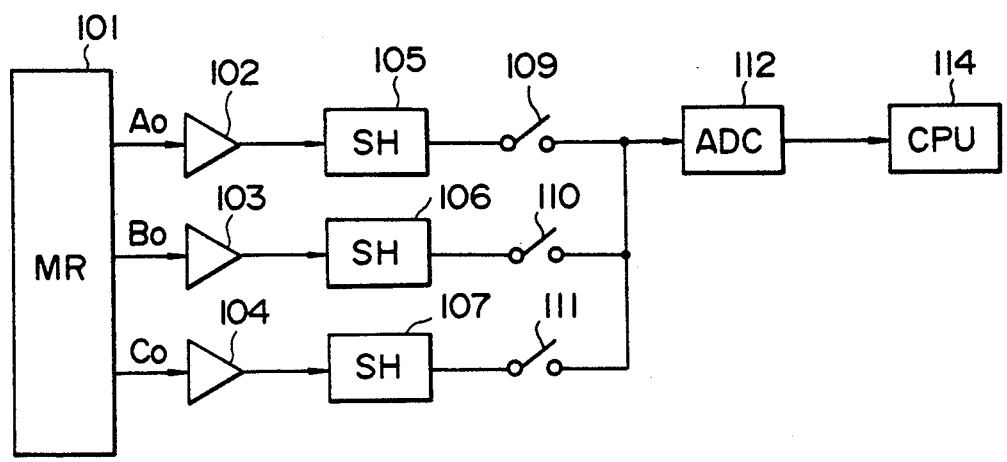
FIG. 14 is a block diagram of a position detecting device of a third embodiment of the present invention.

FIG. 14 shows a circuit configuration of a position detecting device using an MR element for position detection in a VTR camera as a third embodiment of the present invention.

Referring to FIG. 14, the position detecting device includes an MR sensor 101, buffers 102-104, sample-and-hold circuits 105-107, switches 109-111, an A/d converter 112, and a microcomputer body (CPU) 114 connected as illustrated.

Figure 15A:
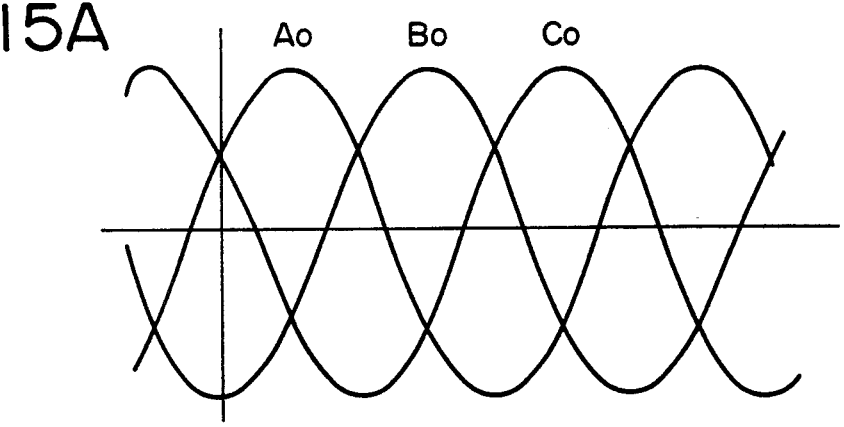
FIGS. 15A and 15B show position detection signal waveforms for FIG. 4.

An equivalent circuit to the MR sensor 13 of FIG. 3 is shown in FIG. 4. When the magnet makes a shift relative to the MR sensor 101, the first-phase position detecting MR element patterns A1 and A2, the second-phase position detecting MR element patterns B1 and B2, and the third-phase position detecting MR element patterns C1 and C2 all connected between ground G and a power supply voltage Vcc, the changes in the resistance value are output as AC voltages. For example, a first-phase position detection signal $A_0$, a second-phase position detection signal $B_0$, and a third-phase position detection signal $C_0$ may be as shown in FIG. 15(a).

The three-phase signals $A_0$, $B_0$, and $C_0$ are regulated for frequency by the traveling speed of the zoom lens but they are all sine waves, or cosine waves, and have a phase difference of 120° between each other.

Figure 15B:
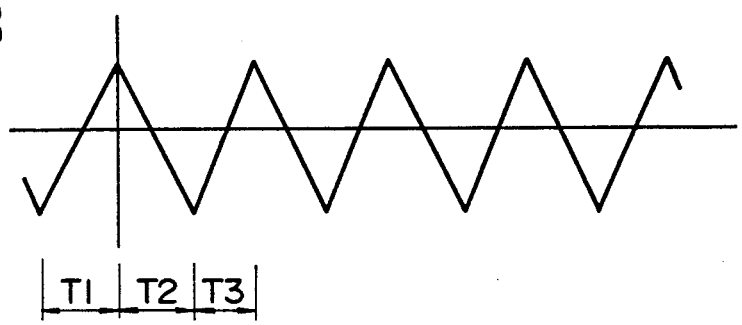

FIG. 15(b) shows a signal waveform provided by the crossing points of the position detection signals $A_0$, $B_0$, and $C_0$ for successive phases and is formed with virtually straight lines.

When the position detection signal of the MR sensor 101 for each phase $A_0$, $B_0$, or $C_0$ is approximated by $$V = V_p \sin \theta \quad (1)$$

the voltage at the crossing point Vcross of successive phases of FIG. 15 is given by $$V_{cross} = V_p \sin(\pi/2n) \quad (2)$$
where n: number of phases, n being odd number, or by
$$= V_p \sin(\pi/m) \quad (3)$$
where m: number of phases, m being even number.

As is apparent from expressions (2) and (3), the voltage at a crossing point Vcross is decreased, and the linearity of the waveform shown in FIG. 15(b) is improved, as the number of phases n or m of the MR sensor 101 is increased. Hence, it is desired that the number of phases n or m of the MR sensor 101 is large. In the following description, however, the case of three phases as shown in FIG. 3 will be described.

Incidentally, in the case of two phases it is folded back by taking the center voltage as a reference and is changed into four phases.

Referring to the circuit of FIG. 14, the buffers 102-104 receive the first-phase position detection signal $A_0$, second-phase position detection signal $B_0$, and third-phase position detection signal $C_0$ and supply them to the sample-and-hold circuits 105-107. The buffers 102-104 may be changed into amplifiers.

The sample-and-hold circuits 105-107 sample and hold the position detection signals $A_0$, $B_0$, and $C_0$ supplied thereto according to A/D conversion speed and timing of the A/D converter 112. The analog switches 109-111 are successively turned on for a predetermined time period. Thereby, the sample and held signals by the sample-and-hold circuits 105-107 are successively converted into digital signals by the A/D converter 112. The output of the A/D converter 112 is supplied to the CPU 114 to be subjected to the signal processing as described below.

Figure 16:
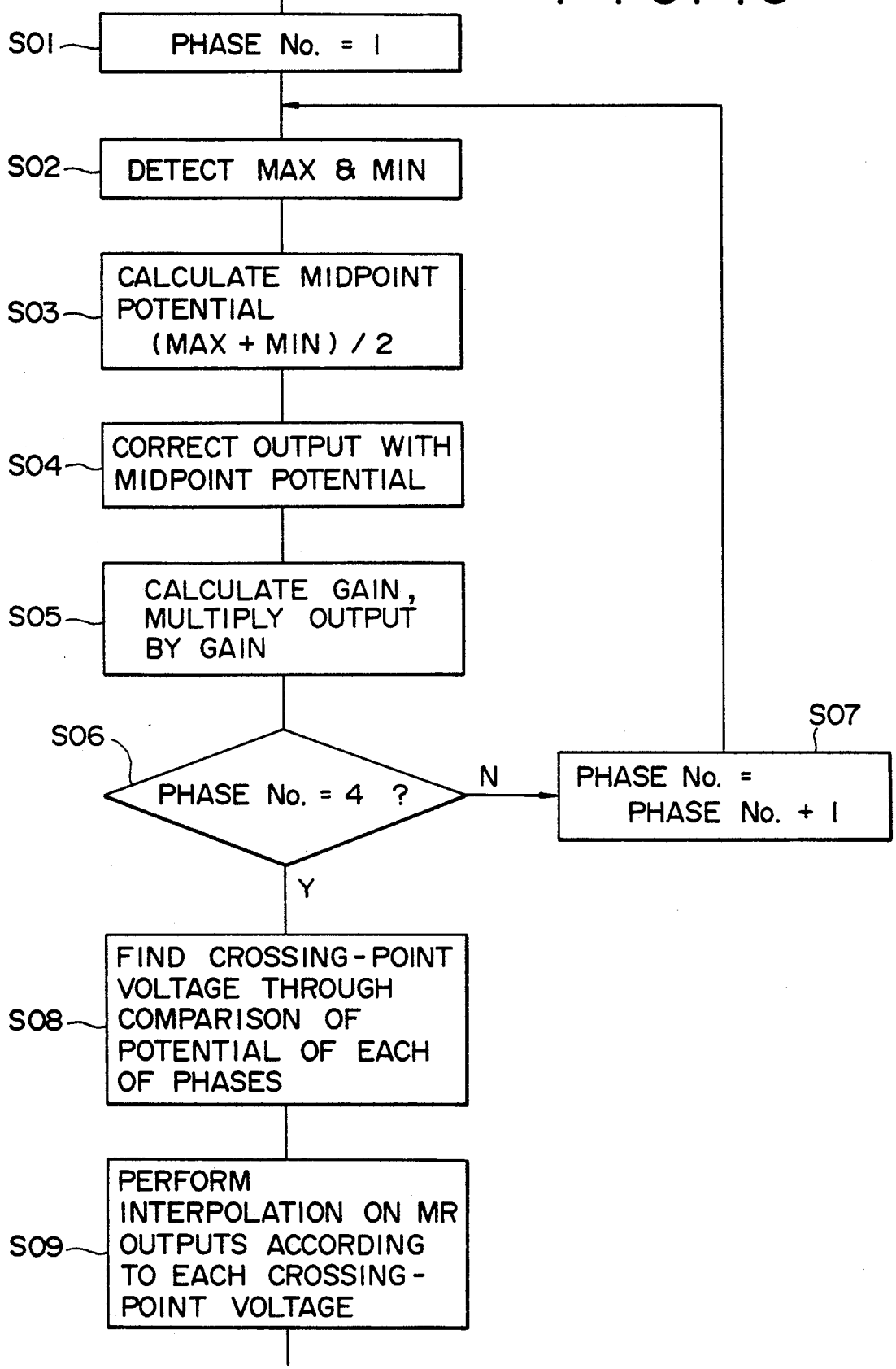
FIG. 16 is an operational flow chart of a microcomputer in FIG. 14.

FIG. 16 is a flow chart showing steps of procedure carried out by the CPU 114.

In steps S01-S081, the CPU 114 carries out the following operations on the three-phase position detection signals.

Step S02: The CPU 14 determines the maximum value MAX and minimum value MIN of the crossing-point voltages of the position detection signals for successive phases on the basis of the readout from the A/D converter 112.

Step S03: The CPU 114 then calculates (MAX+MIN)/2 to thereby calculate the midpoint potential, i.e., the offset voltage.

Step S04: The CPU 114 corrects the position detection signal using the offset voltage obtained in the step S03.

Step S05: The CPU 114 calculates the gain from the difference between MAX and MIN and multiplies the position detection signal by this gain.

Through the above described processing, offset correction and drift correction of the position detection signal for each phase are carried out.

Step S08: The CPU 114 finds the crossing-point voltage through comparison of the potential of each of the phases.

Step S09: The CPU 114 picks up the position detection signal having linearity from each of the crossing point voltages and performs linear interpolation on the position detection signals. More specifically, since the position detection signals $A_0$, $B_0$, and $C_0$ of the MR sensor 101 input through the sample-and-hold circuits 105-107 and the A/D converter 112 are those sampled, the discreteness at the time of sampling is subjected to linear interpolation.

The CPU 114 outputs the position detection signal calculated by linear interpolation to the position control system (not shown) for the zoom lens. The CPU 114 may be used also as the position control system for the zoom lens.

If the interval $\lambda$ of the magnets N and S is set to 150 μm, the spacing between the position detecting MR element patterns for each phase $\lambda/2$, for example A1 and A2, is set to 75 μm. Hence the distanced in FIG. 15(b) is d=25 μm, and the distance d is sampled at 1 ms. Therefore, 64 sampling data are obtained and a position detection signal of minimum resolution of about 0.39 μm can be obtained by interpolation.

The position signal output from the CPU 114 is an incremental signal because the MR sensor 101 exhibits changes in resistance according to changes in the magnetic field, i.e., position changes of the magnets N and S. An absolute position can be obtained by integration (accumulation) of the incremental signal by, for example, a memory within the CPU 114 or a counter.

In the case where the interval $\lambda$ of the magnet is $\lambda=150$ μm, the resolution when position detection is performed with an MR element of a single phase type is $\lambda=150$ μm. Even when a three-phase type is used, the resolution can only be improved to 50 μm. But, by performing the interpolating calculation, the resolution may be remarkably improved as described above.

Since the interpolating calculation is performed on signal components with linearity and, in addition, offset correction and drift correction have been made, high accuracy is ensured.

If the sampling cycle is increased, the interval of the signal subjected to interpolation becomes shorter. Hence, the resolution or accuracy achieved by the interpolating calculation becomes still higher.

Since, as described above, the linearity of the signal components used for the interpolation is improved by increasing the number of phases of the MR sensor 101, the accuracy is much improved.

While, in the above described embodiment, the interpolating calculation is performed using the CPU 114, such interpolating calculation can also be performed with a hardware circuit.

Figure 17:
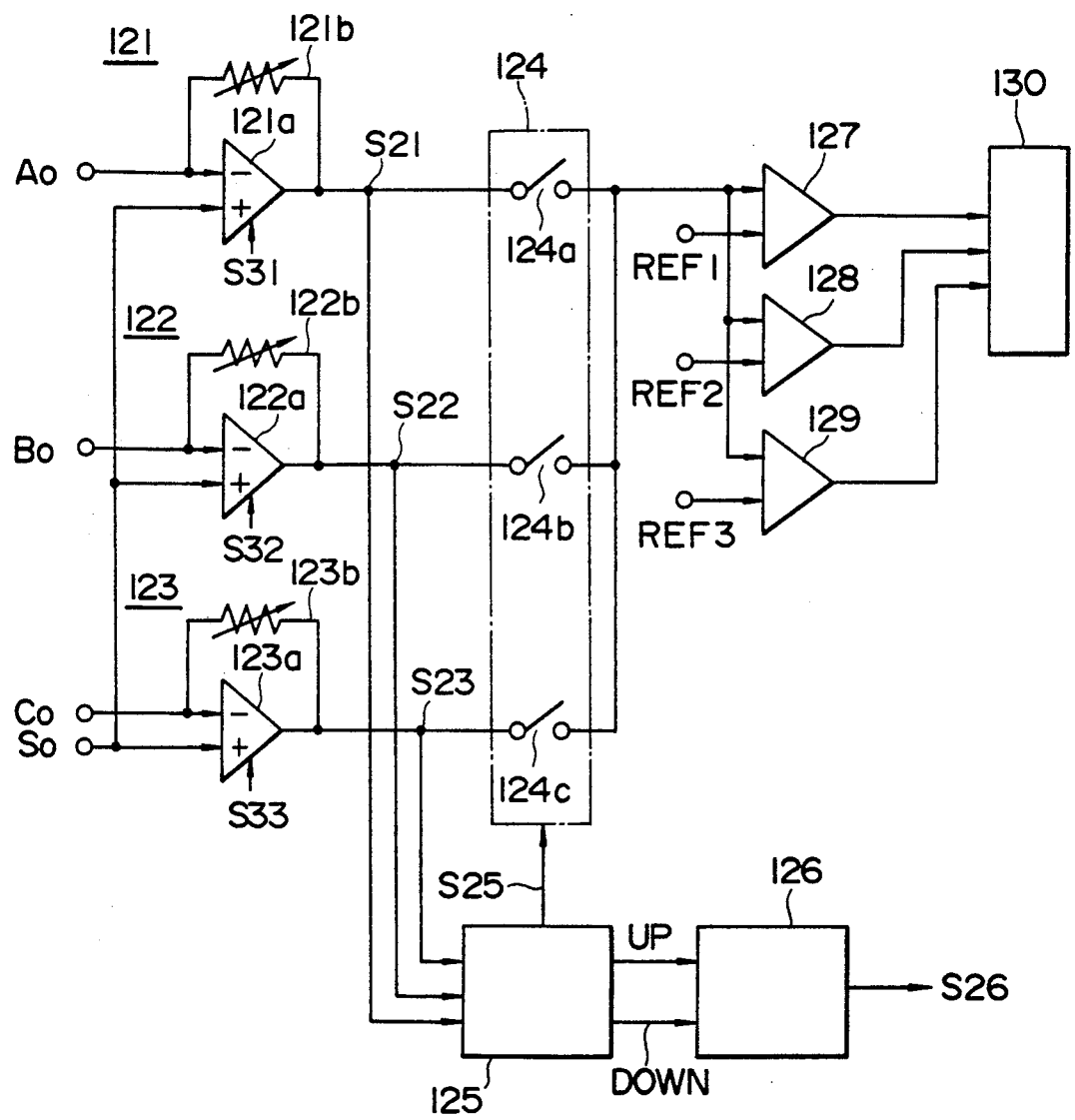
FIG. 17 is a block diagram of a position detecting device according to a fourth embodiment of the present invention.

FIG. 17 is a circuit diagram of a position detecting device realized, as a fourth embodiment of the present invention, with a hardware circuit.

This circuit includes differential amplifier circuits 121-123, a multiplexer 124, a phase discrimination circuit 125, an up/down counter 126, comparators 127-129, and a logical circuit 130 connected as shown in FIG. 6.

The differential amplifier circuit, for example the differential amplifier circuit 121, includes an operational amplifier circuit 121a and a negative feedback resistor 121b, in which the negative feedback resistor 121b formed of a variable resistor is used also for gain adjustment. The operational amplifier circuit 121a amplifies the differential signal of the signal $S_0$ and the first-phase position detection signal $A_0$. Therefore, the noise components commonly superposed on the signal $S_0$ and the first-phase position detection signal $A_0$ are canceled. The differential amplifier circuit 121a is supplied with an offset signal S31 so that offset correction is performed therein.

The phase discrimination circuit 125 receives position detection signals from the differential amplifier circuits 121-123 and detects the phase from the relative magnitudes of these signals.

The phase discrimination circuit 125 detects whether the phase is delayed or advanced. When the phase is advanced, an up pulse UP is generated, whereas when the phase is delayed, a down pulse DOWN is generated to the up/down counter 126. The up/down counter 126 increases the counted value upon receipt of the up pulse UP and decreases the counted value upon receipt of the down pulse DOWN. Thereby, the absolute position can be detected with resolution $\lambda/2$.

The phase discrimination circuit 125, based on the phase detected as described above, turns on the corresponding phase selection switches 124a-124c within the multiplexer 124. For example, during the time period T1 in FIG. 15(b) the phase selection switch 124a is turned on for selecting the first-phase position detection signal $A_0$, during the time period T2 the phase selection switch 124c is turned on for selecting the third-phase position detection signal $C_0$, and during the time period T3 the phase selection switch 124b is turned on for selecting the second-phase position detection signal $B_0$.

The signal from the differential amplifier circuit 121-123 selected through the turning on of the phase selection switch is applied to the comparison circuits 127-129 and compared therein with the corresponding reference voltages REF1-REF3. When the signal is larger than the reference voltage, an output of "1" is generated.

The logical circuit 130 is made up of a plurality of comparator circuits and performs interpolation of the position signal on the basis of the combination of the 5 logical signals from the comparator circuits 127-129.

In the circuit of FIG. 17, the position signal is determined depending on the combination from the output of the counter 126 and the result of the logical decision in the logical circuit 130.

Thus, an interpolated position signal corrected for offset and drift can be obtained also from the circuit of FIG. 17.

The switches 109-111 in FIG. 14 can be eliminated when there are provided A/D converters corresponding, in number, to the number of phases. Likewise, the switches for the multiplexer 124 in FIG. 17 can be eliminated when there are provided the sets of comparator circuits 127-129 corresponding, in number, to the number of phases.

Although in the above description of embodiments, the MR position detecting device of the present invention was described as to its application to position detection of a focus lens in the lens-barrel of a video camera, it may also be applied to position detection of a zoom lens.

The MR position detecting device of the present invention can be not only applied to the position detection of a lens in a video camera but may also be widely applied to position detection of a lens in an ordinary camera and position detection within various instruments in which such high resolution as described above is required.

According to the present invention as described above, a change-in-position detection signal with high resolution and high accuracy can be generated.

Therefore, even if a high resolution is required as in a video camera and yet magnetic poles achieving such high resolution cannot be provided because of difficulties in the formation of magnets, the MR position detecting device according to the present invention makes it possible to provide a change-in-position signal with high resolution.

The MR position detecting device of the present invention can provide a stabilized change-in-position detection signal not affected by the change in temperature and inequalities in manufacturing.

Since the MR position detecting device of the present invention functions in a noncontact manner, the thrust on the object of position detection such as a lens is not lowered and exhibits no wear while it is used for a long time.

Further, since the MR position detecting device of the present invention detects the position of the object of position detection directly, actual changes in position of the object can be detected accurately.

What is claimed is:

1. An MR position detecting device comprising:
   a magnet having magnetic poles alternately magnetized at predetermined intervals;
   a magnetoresistive element having magneto-detectors for a plurality of phases successively disposed a predetermined distance apart, with a pair of said magneto-detectors provided for each phase, wherein said pair of magneto-detectors for each phase change their resistance values in response to the magnetic field of said magnet, are disposed half the formed magnetic pole width, in substance, apart, and are applied with a voltage at both ends of a series connection thereof so as to output a signal from the middle point of the connection; and
   a signal processing circuit for detecting a change in relative position between said magnetoresistive element and said magnet on the basis of a signal obtained from the outputs of said pairs of magneto-detectors for the respective phases of said magnetoresistive element.

2. An MR position detecting device according to claim 1, wherein said pairs of magneto-detectors are successively disposed a distance of formed magnetic pole width/number of phases apart and said signal processing circuit outputs a signal of 2 m pulses where m is an even number 2 or above and is the number of phases or 4 n pulses where n is an odd number 3 or above and is the number of phases for each formed magnetic pole width.

3. An MR position detecting device according to claim 1 or 2, wherein one of said magneto-detectors of each pair is formed of two magneto-detectors spaced the formed magnetic pole width apart and operates complementarily and the other of the same is spaced the formed magnetic pole width apart and adapted to operate complementarily and these sets of magneto-detectors are disposed a distance of half the formed magnetic pole width, in substance, apart.

4. An MR position detecting device according to claim 1, wherein said magneto-detectors for a plurality of phases are of the type for three phases and said pair of magneto-detectors for successive phases are disposed with a phase difference of 120° therebetween.

5. An MR position detecting device comprising a magnetoresistive element for detecting position with a predetermined resolution, to output position detection signals of polyphase sine wave forms in response to a change in relative position with a magnet having magnetic poles alternately magnetized at predetermined intervals, and position calculation means for extracting from the polyphase position detection signals, output from said magnetoresistive element, signals between crossing points of the signals for successive phases and for calculating a position detection signal by performing interpolation on the extracted signals.

6. An MR position detecting device according to claim 5, wherein one of said magnet and said magnetoresistive element is operatively mounted in a camera for movement together with a lens system movably disposed within the camera, while the other of said magnet and said magnetoresistive element is mounted on a portion fixed relative to said movable lens system, and the position of said lens system is adapted to be detected.

7. An MR position detecting device according to claim 5, wherein said position calculation means calculates an offset and gain of said position detection signal for each phase from maximum and minimum values of the signals between crossing points of the polyphase position detection signals, corrects said position detection signal with said offset, and multiplies said position detection signal by said gain, to thereby perform offset correction and drift correction of said position detection signal.

* * * * *

UNITED STATES PATENT AND TRADEMARK OFFICE
CERTIFICATE OF CORRECTION

PATENT NO.   :   5,208,535
DATED        :   May 4, 1993
INVENTOR(S)  :   Akihito Nakayama, et al It is certified that error appears in the above-indentified patent and that said Letters Patent is hereby corrected as shown below:

On the title page, item [73], change "Research Development Corporation of Japan" to --Sony Corporation-- and change the Attorney, Agent, or Firm from "Wenderoth, Lind & Ponack" to --Ronald P. Kananen--.

Signed and Sealed this

Twenty-first Day of December, 1993

Attest:

BRUCE LEHMAN

*Attesting Officer*    *Commissioner of Patents and Trademarks*